US009574854B2

(12) United States Patent
Jonas

(10) Patent No.: US 9,574,854 B2
(45) Date of Patent: Feb. 21, 2017

(54) DIRECTED ENERGY BEAM POWER CONTROL SYSTEM AND METHOD

(71) Applicant: Raytheon Company, Waltham, MA (US)

(72) Inventor: Matthew Jonas, Allen, TX (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 13/671,765

(22) Filed: Nov. 8, 2012

(65) Prior Publication Data

US 2014/0125964 A1    May 8, 2014

(51) Int. Cl.
*F41H 13/00* (2006.01)
*G01S 17/08* (2006.01)

(52) U.S. Cl.
CPC ........ *F41H 13/005* (2013.01); *F41H 13/0043* (2013.01); *G01S 17/08* (2013.01)

(58) Field of Classification Search
CPC ...................................................... G01C 3/08
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | | |
|---|---|---|---|---|
| 5,160,933 | A  * | 11/1992 | Hager .................. | G01S 7/4052 342/120 |
| 5,877,851 | A  * | 3/1999 | Stann ..................... | G01S 17/89 348/135 |
| 2002/0071109 | A1* | 6/2002 | Allen et al. .................. | 356/5.01 |
| 2004/0069927 | A1* | 4/2004 | Billman ................. | H01S 3/005 250/206.1 |
| 2006/0187470 | A1* | 8/2006 | Massey et al. ............... | 356/614 |
| 2009/0119968 | A1* | 5/2009 | Lowell ..................... | F41C 7/00 42/106 |
| 2012/0101658 | A1* | 4/2012 | Bradley .................. | F41G 7/224 701/2 |

\* cited by examiner

*Primary Examiner* — Luke Ratcliffe

(57) ABSTRACT

According to one embodiment, an apparatus includes a directed energy device configured to direct energy onto a remote target under control of a controller. The receives a distance measurement to the target using a rangefinder, determines whether the target is within an expected range; and modifies a power output of the directed energy device when the target is not within the expected range.

23 Claims, 3 Drawing Sheets

DIRECTED ENERGY BEAM POWER CONTROL SYSTEM AND METHOD

TECHNICAL FIELD

This disclosure relates generally to directed energy devices, and more particularly, to a directed energy beam power control system and method.

BACKGROUND

Directed energy devices include those devices that project an energy beam to a remotely located target. Examples of directed energy devices include lasers that project light beams, proton beam generating devices that project proton beams, and microwave beam generating device that generates a beam of radio-frequency (RF) energy.

Lasers are one particular type of directed energy device that has been developed for several different purposes. For example, High energy lasers (HELs) are a particular type of lasing devices configured to direct a large amount of light energy for destroying or otherwise disabling a target. Other types of lasers also include target designators or dazzlers. Target designators modulate its light beam with a signal that is used by a targeting element of a weapon, such as a smart bomb or missile for directing the weapon to its intended target. Dazzlers generate light beams with sufficient energy to temporarily blind or disorient its target.

SUMMARY

This disclosure provides an apparatus and method for controlling the output power of a directed energy device.

According to one embodiment, an apparatus includes a directed energy device configured to direct energy onto a remote target under control of a controller. The controller receives a distance measurement to the target using a rangefinder, determines whether the target is within an expected range; and modifies a power output of the directed energy device when the target is not within the expected range.

According to another embodiment, a method includes determining whether a target is within an expected range using a rangefinder, and modifying a power output of a directed energy device when the target is not within the expected range.

According to yet another embodiment, an apparatus includes a directed energy device configured to direct a light beam onto a remote target and a rangefinder configured to measure a distance to the target that are both controlled by a controller. The controller receives a distance measurement to the target from the rangefinder, determines whether the target is within an expected range, and modifies the power output of the directed energy device when the target is not within the expected range.

Certain embodiments may provide various technical advantages depending on the implementation. For example, certain embodiments of the directed energy device system and method may provide a reduced collateral damage from its use on a military battlefield. Unlike conventional weaponry, such as guns or missiles, light beams generated by these lasers essentially do not include a physical mass whose energy may degrade over long distances. This feature of lasers may be particularly burdensome when used in a theater of battle in which numerous friendly forces or non-combatants may inadvertently lie in the foreground or background of the intended target. Therefore, the directed energy beam power control system according to the present disclosure may provide a lasing system that automatically adjusts or disables the output power generated by these lasers to ensure that only the intended target is affected by their generated beams.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
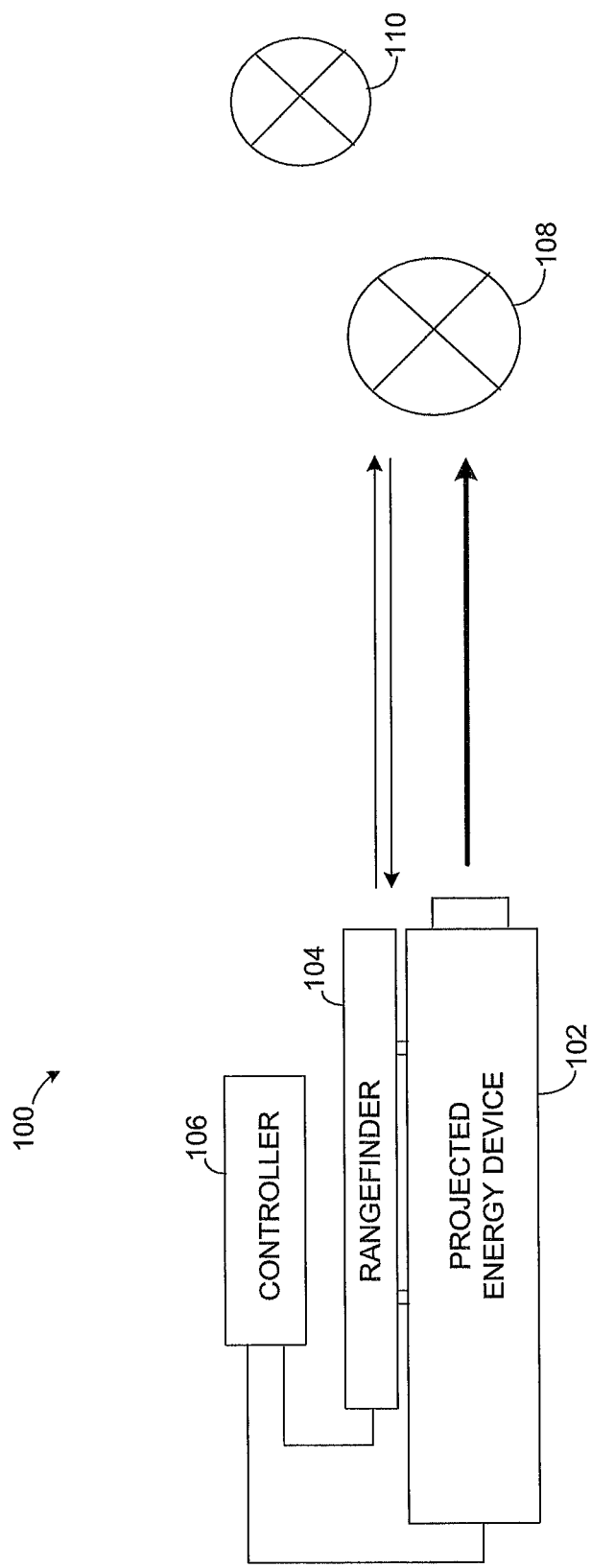
FIG. 1 illustrates an example directed energy beam power control system according to certain embodiments of the present invention.
Figure 2:
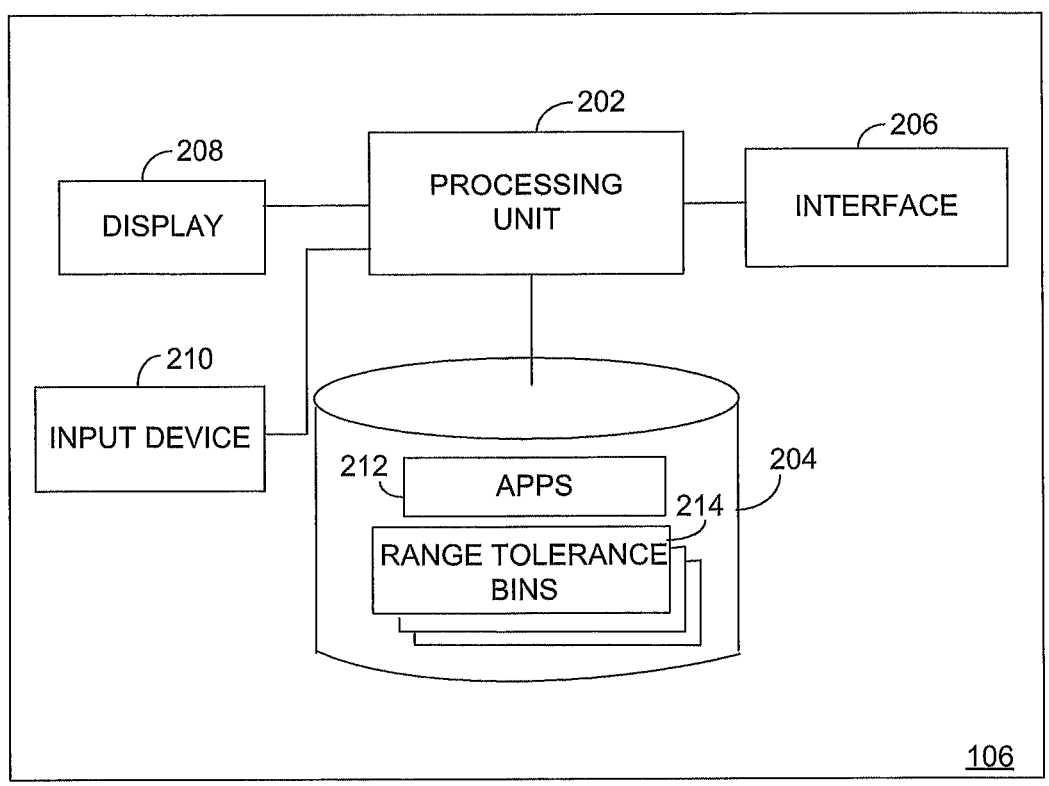
FIG. 2 illustrates an example controller for controlling the operation of the directed energy beam using the rangefinder according to certain embodiments of this disclosure.
Figure 3:
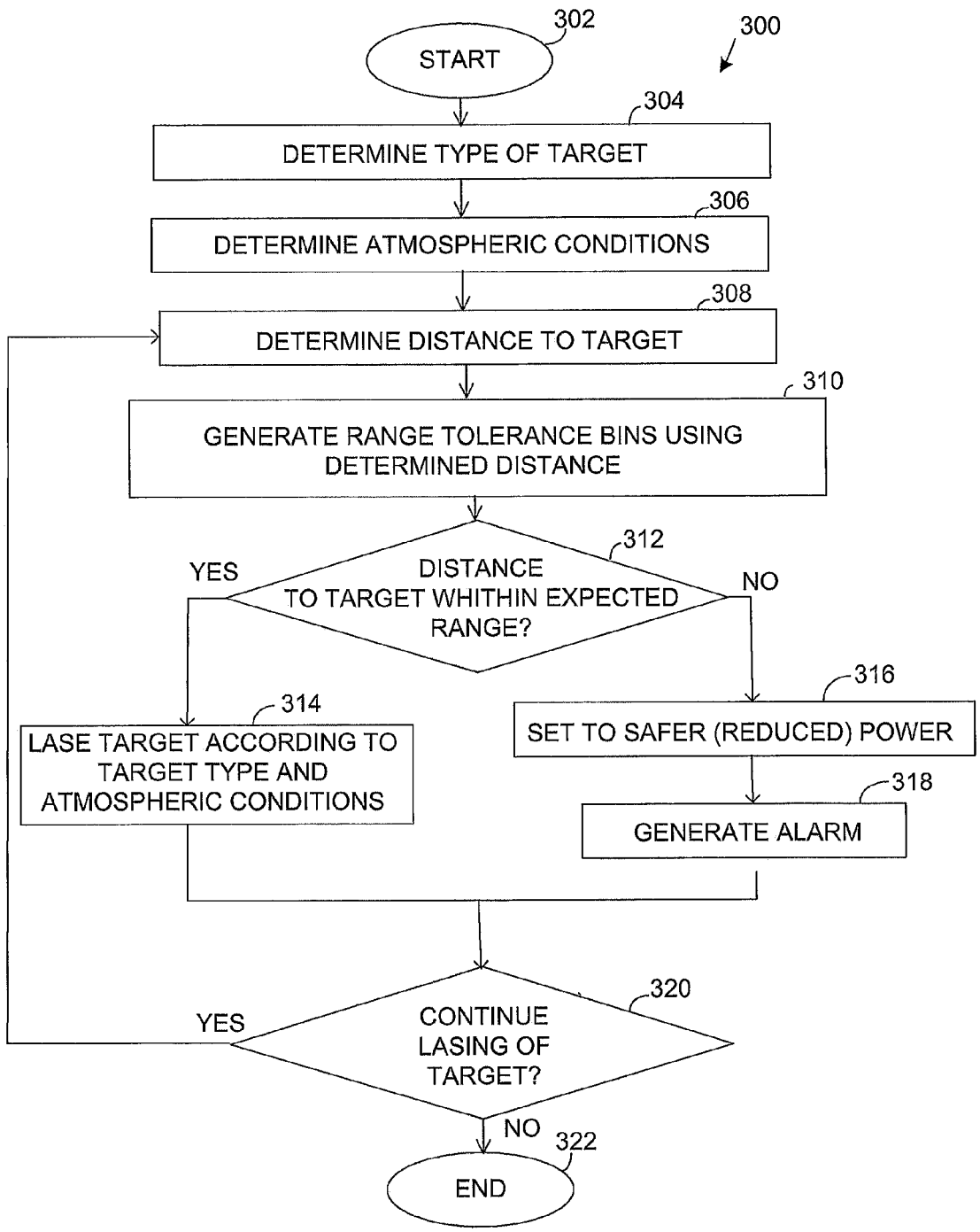
FIG. 3 illustrates an example process that may be performed by the directed energy beam power control system according to certain embodiments of this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device(s) or system(s).

As previously described, directed energy devices includes those devices that project an energy beam to a distally located target. Examples of directed energy devices include lasers that project light beams, proton beam generating devices that project proton beams, and microwave beam generating device that generates a beam of radio-frequency (RF) energy.

One particular drawback, however, that may be experienced with these types of lasers is that the projected beam generated by the directed energy device may be infinitely long. That is, unlike conventional weaponry, such as guns that hurl projectiles or missiles that provide their own propulsion, these projected beams essentially do not include a physical mass whose energy may degrade over long distances. This feature of these projected beams may be particularly burdensome when used in a theater of battle in which numerous friendly forces or non-combatant forces may inadvertently lie in the foreground or background of the intended target. Therefore, it would be beneficial to provide a lasing system that automatically adjusts the output power generated by these devices to ensure that only the intended target is affected by their generated beams.

FIG. 1 illustrates an example directed energy beam power control system 100 according to the teachings of the present invention. Directed energy beam power control system 100 includes a directed energy device 102 and a rangefinder 104 that are both coupled to a controller 106. The rangefinder 104 measures a distance to a target 108. The controller 106 receives this measured distance from the rangefinder 104 and adjusts an output power of the directed energy device 102 if the measured range is not within an expected range or distance to the target.

For example, in the particular embodiment shown, the target 108 is an airborne missile and another object 110, which may be a friendly aircraft, is flying in the general vicinity of the target 108. While the target 108 has been determined to have a range of approximately 8.6 miles, the friendly object 110 has a range that is approximately 11.3 miles. Thus, the controller 106 configures one or more range tolerance bins that include one or more expected distances to the target 108, such as a range of 8.0 miles to 9.0 miles. Thus, if the distance measured by the rangefinder 104 is in the range of 8.0 to 9.0 miles, the controller 106 controls the directed energy device 102 to generate its light beam at the effective power. Conversely, if the distance measured by the rangefinder 104 is outside of these limits, the controller 106 restricts the amount of power that can be generated by the directed energy device 102.

In one embodiment, the controller 106 may shut off power to the directed energy device 102. In other embodiments, however, the controller 106 may only limit the amount of output power generated by the directed energy device 102 to be a portion of its output power generated when the measured distance is within the expected range. A configuration such as this may be particularly useful when a precision of the measured distance of the target 108 is limited, and no known friendly forces are known to be in the area.

The rangefinder 104 may be any device that has a similar field-of-view relative to that of the directed energy device. In this manner, the rangefinder 104 has a similar beam dispersion as that of the directed energy device 104 such that the measured range indicates where and to what extent, the beam generated by the directed energy device will hit. In some embodiments, the rangefinder is bore-sighted with the directed energy device 102. That is, the rangefinder 104 is configured to be continually pointed in the same direction as the directed energy device 102. In this manner, the rangefinder 104 will provide measured distance values at whatever target the light beam of the directed energy device 102 will impinge upon. For example, the rangefinder 104 may be physically mounted on the directed energy device 102 and sighted in a manner similar to a scope configured on a rifle.

The rangefinder 104 generally includes a device that uses a laser to determine distance to an object. Generally, the rangefinder 104 includes a laser transmitter that operates on the time of flight principle by sending a laser pulse toward an object whose distance is to be measured, receiving a reflected pulse, and measuring the time delay between the emitted light pulse and the reflected pulse to determine the distance. In one embodiment, the rangefinder 104 may emit laser light at a wavelength that is different from the wavelength of light emitted by the directed energy device 102. In this manner, potential interference due to reflected light generated by the directed energy device 102 may be reduced or eliminated. Additionally, the rangefinder 104 may emit light having an output power that is substantially less than the output power generated by the directed energy device 102.

Although the embodiment shown above is configured with a rangefinder 104, any suitable distance measuring device may be used. Examples of other suitable types of rangefinders includes, but is not limited to, light detection and ranging (ladar) devices and radio detection and ranging (radar) devices. The ladar generally includes an optical remote sensing device that measures a distance to an object by illuminating the target with light. The radar functions in a somewhat similar manner to the ladar, but uses radio waves projected toward and reflected from the object. Additionally, the rangefinder 104 may be integral (e.g., embedded) in the directed energy device 102.

As another example, a triangulation measuring device may be a suitable rangefinder device. The triangulation measuring device operates on the principle of trilateration in which two or more sensors that are physically separated from one another detect pulses reflected or otherwise emitted by an object, and determine the distance to the object using triangulation.

As another example, the rangefinder may include an image processing system that includes a video camera synchronized to the directed energy device 102 that generates a raster image including the target and a processor that determines a distance to an object by processing the received image.

As another example, the rangefinder may include any type of knowledge gathering system, such as intelligence gathering devices, which enable personnel to form a priori knowledge of the expected existence of the target and thus its general position relative to the directed energy beam power control system 100. Thus, the expected range of the target 108 may be manually entered using this a priori knowledge.

The directed energy device 102 may include any suitable type that directs an energy beam to a distally located target. For example, the directed energy device 102 may be a High energy laser (DIRECTED ED ENERGY DEVICE) that emits light energy for destroying or otherwise disabling a target. As another example, the directed energy device 102 may be a target designator that modulates its light beam with a signal that may be used by a targeting element of a weapon, such as a smart bomb or missile for directing the weapon to its intended target, or a dazzler that generates a light beam with sufficient energy to temporarily blind or disorient its target. As yet another example, the directed energy beam power control system 100 may include a proton beam generating device that generates a beam of high energy protons. As yet another example, the directed energy beam power control system 100 may include a high power microwave beam generating device that generates a high energy microwave beam.

Although FIG. 1 illustrates one example of a directed energy beam power control system 100, various changes may be made to FIG. 1. For example, the directed energy beam power control system 100 may be portably mounted on a moving vehicle, such as a truck, ship, or airplane, or mounted stationary on a fixed platform. As another example, the functional division shown in FIG. 1 is for illustration only. Various components in FIG. 1 could be omitted, combined, or further subdivided and additional components could be added according to particular needs. As specific examples, the directed energy beam power control system may use multiple rangefinders that function together in order to provide enhanced accuracy of the distance to the target. Additionally, the controller 106 may be mounted on the same platform on which the directed energy device 102 and rangefinder is mounted, or the controller 106 may be configured remotely from the directed energy device 102 and rangefinder 104.

FIG. 2 illustrates an example controller 106 for controlling the operation of the directed energy device 102 using the rangefinder 104 according to this disclosure. Although specific details and components will be shown for a particular controller, in other configurations, the controller may have more, less, or different components. As shown in FIG. 2, the controller 106 includes at least one processing unit 202, at least one memory unit 204, at least one interface 206, an optional display 208, and at least one input device 210.

The processing unit 202 represents any suitable processing device(s), such as a microprocessor, microcontroller, digital signal processor, application-specific integrated circuit, field programmable gate array, or other logic device. The memory unit 204 represents any suitable volatile and/or non-volatile storage and retrieval device(s), such as random access or read-only memory. The interface 206 represents any suitable interface for facilitating communication over one or more networks, such as an Ethernet interface or other electrical signal line interface or a wireless interface. The interface 206 can be used to receive atmospheric conditions or optical density measurements or to output data to other devices or system. The display 208 is optional and represents any suitable display device for presenting information to a user. The input device 210 represents any suitable device(s) for receiving input from a user, such as a keyboard or mouse.

In FIG. 2, the memory unit 204 includes at least one executable application 212 and multiple range tolerance bins 214 defining expected ranges to the target. The purpose and function of the range tolerance bins 214 will be described in detail below. The application 212 represents one or more computer programs defining how the controller 106 controls operation of the directed energy device 102. For example, the application 212 may include instructions for receiving a signal from the rangefinder 106 and determining whether to reduce output power from the directed energy device 102 based on the received measurements. The determination could be performed on a one time basis or on a continual, on-going basis. The application 212 could also include instructions for other features, such as generating an alarm if the measured distance of the target falls outside of its expected limits.

Although FIG. 2 illustrates one example of a controller 106 for controlling operation of the directed energy device 102, various changes may be made to FIG. 2. For example, the controller 104 could include any other or additional components according to particular needs. Also, the controller 104 could be implemented using any suitable monitoring or control technology. In addition, the controller 104 could be used to control one or multiple directed energy devices 102.

FIG. 3 illustrates an example process that may be performed by the directed energy beam power control system of FIG. 1. At step 302, the process is initiated.

In step 304, the type of target is determined. The type of target may be used by the directed energy beam power control system to determine an amount of power to be administered to the target for achieving a goal of degrading the target. One goal of degrading the target may include destroying the target. Another goal of degrading the target may include blinding the target. For example, it may be previously determined that a particular type of enemy missile requires a given power level of energy impinged on its surface for a given time period to destroy the missile. Thus, information associated with the type of target may be useful for the directed energy beam power control system 100 to accomplish its goal of degrading the missile.

In one embodiment, the type of target may be manually ascertained and inputted into the directed energy beam power control system using a suitable input device, such as a keyboard and/or a pointing device, such as a mouse. In another embodiment, the directed energy beam power control system may determine the type of target using telemetry information from one or more sensors that measure various characteristics of the target, such as audio noise generated by the target, velocity of the target, color of the target, and the like. In yet another embodiment, the directed energy beam power control system may receive information associated with the type of target from another processing system or systems that determines the type of target using information from sensors as previously described.

In step 306, atmospheric conditions between the directed energy beam power control system and the target may be determined. In general, the light beam generated by the directed energy device 102 can be affected by aberrations in the atmosphere that may cause the beam to diverge and/or refract away from the target. Additionally, visibility limiting phenomena, such as fog, haze, or airborne dust may also limit the ability of the light beam generated by the directed energy device 102 to reach its intended target. Thus, the directed energy beam power control system may use information associated with ambient atmospheric conditions to adjust the output power of the beam such that the goal of degrading the target may be achieved.

In step 308, the directed energy beam power control system determines a distance to a target. The distance to the target may be obtained from any suitable type and number of rangefinders, such as one or more distance measuring devices described above.

In step 310, the directed energy beam power control system may generate multiple range tolerance bins using the determined distance to the target. The range tolerance bins generally define one or more expected ranges that the target is expected to be at over an elapsed period of time. Continuing the example described above in which a particular type of missile requires a given power level impinged on its surface for a given time period, a series of range tolerance bins may be generated in which each range tolerance bin specifies a certain power output level to be generated by the directed energy device 102 to deliver the necessary energy to the surface of the missile. Each range tolerance bin includes a lower distance limit and an upper distance limit. Thus, when the measured distance to the target falls within an expected distance, a particular range tolerance bin may be selected such that adequate output power is delivered by the directed energy device 102 for destroying the target.

In one embodiment, the range tolerance bins may be organized according to dynamic movement of the target. For example, the missile described may have a speed and direction that causes its distance from the directed energy beam power control system 100 to be continually changing (e.g., either towards or away from the directed energy beam power control system). Thus in this case, multiple range tolerance bins may be adaptively used such that an adequate amount of output power is delivered to the target during its dynamic movement relative to the directed energy beam power control system.

In step 312, the directed energy beam power control system determines whether the target is within one or more of the range tolerance bins. If so, processing continues at step 314; otherwise, processing continues at step 316.

In step 314, the directed energy beam power control system 100 generates a directed energy beam towards the target using a power level based on the determined target type and atmospheric conditions. As previously described, the directed energy beam may be any suitable type, such as a laser beam, a micro-wave beam, or a proton beam.

In step 316, the directed energy beam power control system 100 has determined that the target is outside of the accepted range tolerance bins and therefore, the output power of the directed energy device is set to a safer reduced power level. In some embodiments, the output power may be reduced to a specified amount. That is, the output power of the directed energy device may be set to be a specified fraction of its maximum output power. In other embodiments, the directed energy beam power control system may shut off power to the directed energy device such that no beam is generated.

In step 318, the directed energy beam power control system 100 may optionally generate an alarm indicating to its user, that the target has fallen out of range as specified in the selected range bins. In some cases, the directed energy beam power control system 100 may generate the alarm after a specified amount of time such that spurious noise or transient changes in the measured range to the target may be filtered. For example, the directed energy beam power control system 100 may be used in a region in which migratory birds are known to flock from time to time. It is also known that interruption of the beam due to flocking of these birds may exist for a specified duration. Thus, the alarm may be configured with a certain hold-off window such that the alarm is not inadvertently generated due to the flocking birds. Nevertheless, during this time, the directed energy device may still be reduced to a safe power level such that the birds are not hurt.

In step 320, the directed energy beam power control system determines whether its use is to be continued. For example, continued use of the directed energy beam power control system may be determined manually according to an input signal inputted by a user. In another embodiment, the directed energy beam power control system may include one or more sensors that continually monitor the condition of the target. Using these sensors, operation of the directed energy beam power control system may be continued until a signal is received from the sensors indicating that the target has been destroyed. If the goal is to blind the target, operation of the directed energy beam power control system may be continued for an extended period of time, such as throughout the useable range of the directed energy device. Nevertheless, if continued use of the directed energy beam power control system is desired, processing continues at step 308; otherwise, processing continues at step 322 in which the process ends.

Although FIG. 3 illustrates one example of a method 300 for controlling the output power of a directed energy device, various changes may be made to FIG. 3. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with" and its derivatives mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "receive" and its derivatives include receipt from an external source or an internal source.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a directed energy device configured to direct energy onto a remote target; and
a controller configured to:
receive a distance measurement to the target using a rangefinder;
generate a plurality of range tolerance bins using the distance measurement, the plurality of range tolerance bins including a plurality of expected ranges;
determine whether the target is within an expected range of distance of one of the range tolerance bins according to the distance measurement; and
modify a power output of the directed energy device when the target is not within the expected range of distance of the one of the range tolerance bins.

2. The apparatus of claim 1, wherein the directed energy device comprises a high energy laser (HEL).

3. The apparatus of claim 1, wherein the rangefinder comprises a laser rangefinder.

4. The apparatus of claim 3, wherein the directed energy device comprises a high energy laser (HEL), and wherein the laser rangefinder has a lower power output level than the HEL.

5. The apparatus of claim 4, wherein the laser rangefinder is configured to generate light energy having a wavelength that is different from a wavelength of light energy generated by the HEL.

6. The apparatus of claim 4, wherein the laser rangefinder is bore-sighted with the HEL.

7. The apparatus of claim 1, wherein the controller is configured to shut off the power output of the directed energy device when the target is not within the expected range.

8. The apparatus of claim 7, wherein the controller is configured to adjust the power output of the directed energy device according to the distance measurement to achieve a goal of degrading the target.

9. The apparatus of claim 8, wherein the goal comprises blinding the target.

10. The apparatus of claim 8, wherein the goal comprises destroying the target.

11. The apparatus of claim 1, wherein the controller is configured to modify the power output of the directed energy device according to multiple distance measurements that change over time.

12. The apparatus of claim 1, wherein the rangefinder comprises at least one of a radar, a triangulation measurement device, an image processing device, and a ladar.

13. The apparatus of claim 1, wherein the plurality of expected ranges of the plurality of range tolerance bins is where the target is expected to be at over a period of time.

14. The apparatus of claim 1, wherein the controller is configured to modify the power output of the directed energy device according to at least one of a type of the target and an atmospheric condition proximate the target.

15. A method comprising:
generating a plurality of range tolerance bins including a plurality of expected ranges;
determining, using a rangefinder, whether a target is within an expected range of distance of one of the range tolerance bins according to a distance measurement; and
modifying a power output of a directed energy device when the target is not within the expected range of distance of the one of the range tolerance bins.

16. The method of claim 15, further comprising:
determining a type of the target; and
modifying the power output of the directed energy device according to the determined type of target.

17. The method of claim 15, wherein the plurality of expected ranges of the plurality of range tolerance bins is where the target is expected to be at over a period of time.

18. The method of claim 15, further comprising:
determining a speed of movement of the target; and
modifying the power output of the directed energy device according to the determined speed of movement.

19. The method of claim 15, wherein the directed energy device comprises a high energy laser (HEL).

20. The method of claim 15, wherein the rangefinder comprises a laser rangefinder.

21. The method of claim 15, further comprising:
shutting off the power output of the directed energy device when the target is not within the expected range.

22. The method of claim 15, further comprising:
adjusting the power output of the directed energy device according to the distance measurement to achieve a goal of degrading the target, the goal comprising at least one of blinding the target and destroying the target.

23. An apparatus comprising:
a high energy laser (HEL) configured to direct a light beam onto a remote target;
a laser rangefinder configured to measure a distance to the target; and
a controller configured to:
receive, from the rangefinder, a distance measurement to the target;
generate a plurality of range tolerance bins using the distance measurement, the plurality of range tolerance bins including a plurality of expected ranges;
determine whether the target is within an expected range of distance of one of the range tolerance bins according to the distance measurement; and
modify a power output of the HEL when the target is not within the expected range of distance of the one of the range tolerance bins,
wherein the laser rangefinder is configured to generate light energy having a wavelength that is different from a wavelength of light energy generated by the HEL.

* * * * *